United States Patent [19]

Göldner

[11] Patent Number: 4,595,238

[45] Date of Patent: Jun. 17, 1986

[54] VEHICLE SEAT

[75] Inventor: H. Walther Göldner, Denkendorf, Fed. Rep. of Germany

[73] Assignee: Keiper Recaro GmbH & Co., Fed. Rep. of Germany

[21] Appl. No.: 654,150

[22] Filed: Sep. 25, 1984

[30] Foreign Application Priority Data

Oct. 19, 1983 [DE] Fed. Rep. of Germany ....... 3337910

[51] Int. Cl.⁴ .............................................. A47C 7/02
[52] U.S. Cl. ................................... 297/452; 297/354; 297/460
[58] Field of Search ............... 297/452, 460, 354, 450

[56] References Cited

U.S. PATENT DOCUMENTS 2,138,314 11/1938 Van Derveer ...................... 297/460
2,186,301 1/1940 La More ........................ 297/460 X
3,695,707 10/1972 Barecki et al. ..................... 297/460
4,065,182 12/1977 Braniff et al. .................. 297/460 X
4,502,728 3/1985 Sheldon ............................... 297/460

FOREIGN PATENT DOCUMENTS 3046427 7/1982 Fed. Rep. of Germany .

Primary Examiner—James T. McCall
Attorney, Agent, or Firm—Wigman & Cohen

[57] ABSTRACT

A motor vehicle seat having a backrest pivotable about the seat which includes a thin plate with longitudinal beams welded to the edges of the plate and a reinforcing element connected to the backrest adjacent the pivot axis.

18 Claims, 4 Drawing Figures

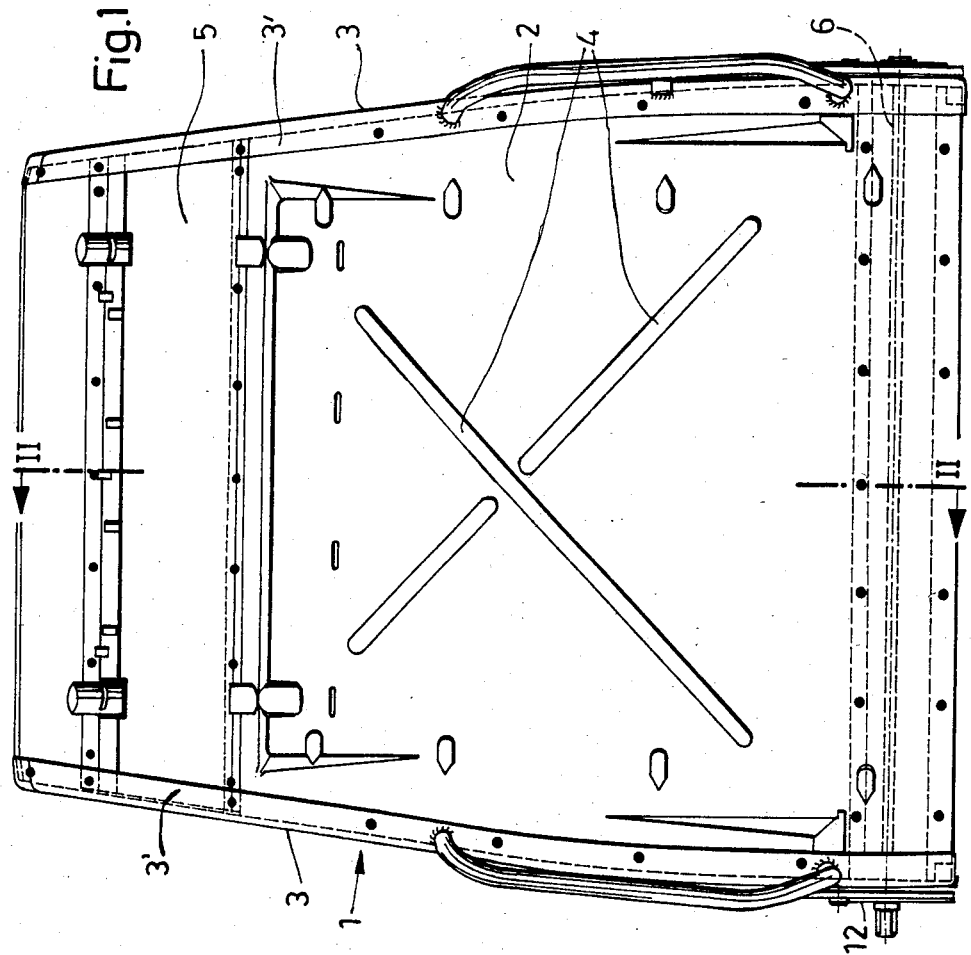
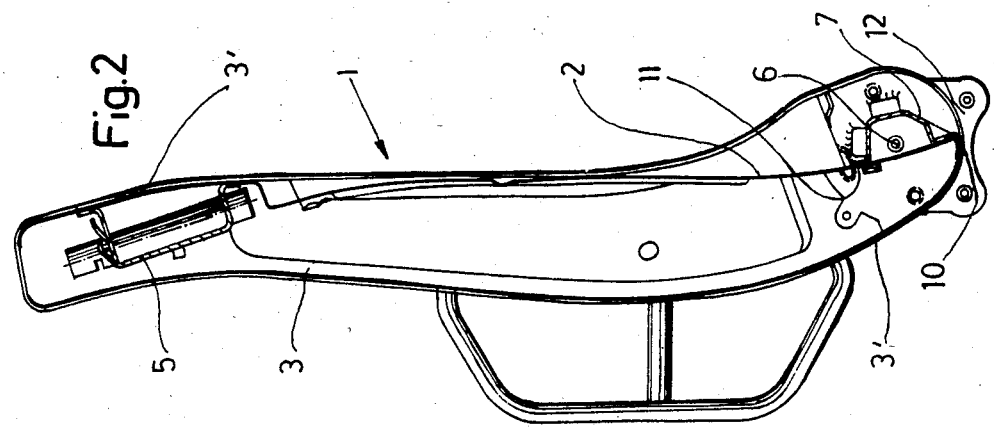

VEHICLE SEAT

BACKGROUND OF THE INVENTION

The present invention relates to a vehicle seat with a backrest that can be pivoted relative to a seat portion about a lateral axis. The backrest includes two longitudinal beams defining its lateral sides and a thin plate which is rigidly connected to the two longitudinal beams along its two lateral edge areas.

In known seats of this type, the torsional rigidity of the backrest depends largely on the stiffness of the longitudinal beams because of the limited thickness of the plate forming the center portion of the upholstery support. An increase in the torsional rigidity therefore requires a reinforcement of the longitudinal beams which, however, is undesirable because of the increased weight.

OBJECTS AND SUMMARY OF THE INVENTION

An object of the invention is to create a vehicle seat of the type described above in which the backrest has a better weight to torsional rigidity ratio and in which the torsional rigidity can therefore be increased without a significant increase in weight.

That object is achieved by a vehicle seat having the plate include a reinforcing element which extends in the lateral direction of the backrest. In the end section containing the lateral axis, the plate can increase the torsional rigidity to a desired value without a significant increase in weight. Accordingly, by means of the positioning of the reinforcing element, an undesirable reinforcement of the impact area of the plate is avoided. A further important advantage of the reinforcing element according to the invention is that it can be adapted to various special requirements while only requiring minimal space. Therefore, it requires no additional modifications to the backrest and is capable of being used in known designs.

The reinforcing element may simply consist of a commonly shaped bar. Preferably, however, it is a sheet metal element because by this means, despite lower costs, the shape and, particularly, the cross-sectional shape, can be adapted to the specific requirements, and leads to an optimal ratio of weight to effective reinforcement. With a sheet metal element of this type, differently shaped elements can be provided in individual sections in order, for example, to be able to house a drive mechanism for the articulated fitting in the end sections and keep the space required in the center section to a minimum. In addition, a sheet metal element makes it possible, without additional expense, to provide connecting elements, by means of which a problem-free connection is possible to the other structural elements, particularly the longitudinal beams. In a preferred exemplary embodiment, the reinforcing element has an essentially U-shaped profile with longitudinal flange-like abutment and connection strips. This type of profile also has the advantage that the lateral axis can run in the hollow chamber formed by this reinforcing element together with the plate. Of course, other cross-sectional shapes are also possible.

A reinforcing element manufactured from sheet metal also makes it possible without significant additional expense to provide flange elements or tangs for spot-welding to the longitudinal beams and to form longitudinally-spaced depressions for spot-welding to the plate and to increase the rigidity.

The reinforcing element can also be formed in one piece with the plate.

The invention is described in greater detail below with the aid of an exemplary embodiment illustrated in the drawings.

With the foregoing and other objects, advantages and features of the invention that will become hereinafter apparent, the nature of the invention may be more clearly understood by reference to the following detailed description of the invention, the appended claims and to the several views illustrated in the attached drawings.

BRIEF DESCRIPTION OF THE DRAWINGS

FIG. 1 is a front view of the upholstery support of the backrest according to the present invention;

FIG. 2 is a longitudinal cross section of the preferred embodiment taken along line II—II of FIG. 1;

DETAILED DESCRIPTION OF A PREFERRED EMBODIMENT

Figure 4:
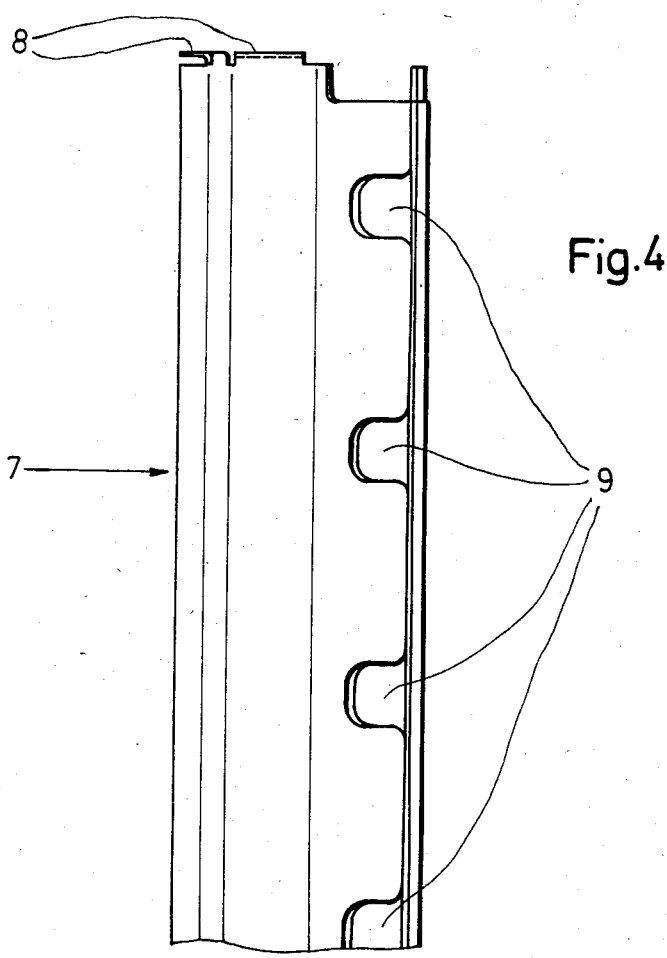
FIG. 4 is an enlarged, partially illustrated front view of the reinforcing element of the preferred embodiment.

An upholstery support 1 of a backrest of a motor vehicle seat shown illustrated in FIGS. 1 and 2 has a plate 2 made of a thin steel sheet, as well as two mirror-image, identical longitudinal beams 3, which also are made of steel sheet. In order to give the longitudinal beams 3 the necessary rigidity, they have a raised edge 3', which runs essentially over the entire periphery, and a wide, longitudinal reinforcing seam in its central section. The longitudinal sides of the plate 2 are spot welded to the two longitudinal beams 3. Except for its lower third, the plate 2 lies against the rear raised edges 3' of the longitudinal beams 3. The upper area of the plate 2, which has two diagonal reinforcing seams or ribs 4 in its central area, supports a cross beam 5, which extends from one longitudinal beam 3 to the other and has holders for a headrest. The lower ends of the two longitudinal beams 3 are rigidly connected with respective articulated fittings 12.

A torsionally rigid lateral axis 6 is arranged concentrically with the pivot axis of the backrest and is formed by a pipe. It has the purpose of transferring a pivoting movement of the fitting element connected with the longitudinal beam on one side, or a torque acting on this fitting element, to the corresponding fitting element of the articulated fitting on the other side.

Figure 3:
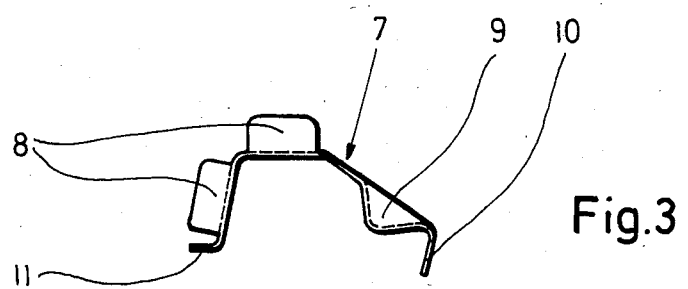
FIG. 3 is an enlarged side view of the reinforcing element of the preferred embodiment.

A reinforcing element 7 is arranged parallel to the lateral axis 6 in such a manner that the lateral axis 6 lies in the hollow chamber defined by said element 7 and the plate 2. The reinforcing element 7, which is formed from steel sheet, has the purpose of increasing the torsional rigidity of the upholstery support 1. Therefore, as shown in FIGS. 2 and 3, it has a polygonal, essentially U-shaped cross section. In the exemplary embodiment, the upper, shorter shank with the yoke section encloses an angle of slightly more than 90°, whereas the angle between the yoke section and the lower, longer shank is 135°. Tangs 8 are formed on its two end surfaces, which tangs abut the longitudinal beams 3 and are welded thereto. Outside, bent flange elements 10 and 11 are connected to the two shanks of the reinforcing element 7, and extend longitudinally over the entire length of the reinforcing element 7. The flange element 10 overlaps the lower lateral edge of the plate 2 and, as shown in FIG. 2, against the raised edge 3' of the two longitudinal beams 3, to which it is welded. The other flange element 11 abuts the back side of the plate 2 and is spot welded thereto.

In the shank supporting the flange element 10, the reinforcing element 7 has molded depressions 9 having the same V-shaped cross section and the same width. These depressions 9 are longitudinally spaced from each other and serve to increase the rigidity of the reinforcing element 7 and to form contact surfaces for the adjacent flange element 10, which contact surfaces abut the plate 2 and are spot welded thereto.

All characteristics mentioned in the above specification, as well as those taught solely from the drawings, are elements of the invention as additional embodiments, even though they were not particularly emphasized and particularly are not mentioned in the claims.

Although only preferred embodiments are specifically illustrated and described herein, it will be appreciated that many modifications and variations of the present invention are possible in light of the above teachings and within the purview of the appended claims without departing from the spirit and intended scope of the invention.

What I claim is:

1. A backrest for a motor vehicle seat, comprising:
   two longitudinal beams defining the lateral sides of the backrest;
   a thin plate rigidly connected to the two longitudinal beams at spaced points along each of the lateral edge areas of the plate;
   said backrest being pivotable relative to the seat about a lateral axis; and
   said plate having a reinforcing element in an end section adjacent the lateral axis which extends in the lateral direction of the backrest, said reinforcing element being formed as a cover for the lateral axis, said lateral axis lying between the cover and said plate.

2. The backrest according to claim 1, wherein the lateral axis is covered toward the rear by the reinforcing element and toward the front by the plate.

3. The backrest according to claim 1, wherein the reinforcing element is made of sheet metal.

4. The backrest according to claim 3, further comprising different cross-sectional shapes of the reinforcing element in successive longitudinal sections.

5. The backrest according to claim 1, wherein the reinforcing element is formed in one piece with the plate.

6. The backrest according to claim 1, wherein the reinforcing element is rigidly connected with the plate at least over a portion of the length of the reinforcing element.

7. The backrest according to claim 1, wherein the reinforcing element is rigidly connected with the longitudinal beams.

8. The backrest according to claim 1, wherein the reinforcing element has longitudinally spaced, molded depressions.

9. The backrest according to claim 1, wherein the reinforcing element has a different cross-sectional shape and/or a different cross-sectional size in its two end sections than it does in the section lying therebetween.

10. The backrest according to claim 1, wherein the reinforcing element has a U-shaped cross section and further comprising flange elements connected longitudinally to flanges of the element.

11. The backrest according to claim 1, wherein the reinforcing element abuts the rear side of the plate.

12. The backrest according to claim 1, wherein the reinforcing element has tangs at its two ends which are welded with the longitudinal beams.

13. The backrest according to claim 1, wherein said reinforcing element is secured to said plate at two spaced areas extending in the lateral direction between the longitudinal beams, the reinforcing element and a portion of the plate between said two spaced areas forming a hollow tubular structure having a longitudinal axis parallel to the lateral axis, said hollow tubular structure enclosing the lateral axis between the longitudinal beams.

14. The backrest according to claim 13, wherein said reinforcing element is formed as a generally U-shaped channel member in transverse cross-section, the ends of said channel member each having a plurality of tangs extending perpendicular to the longitudinal axis thereof, said tangs being affixed to a respective longitudinal beam.

15. The backrest according to claim 14, wherein said U-shaped channel member is provided along its longitudinal extent with a plurality of longitudinally spaced depression means for increasing the rigidity of the reinforcing element.

16. The backrest according to claim 15, wherein said depression means comprise molded depressions having a V-shaped cross-section transversely of the channel member.

17. The backrest according to claim 16, wherein said reinforcing element is affixed to said plate by spot welds between the molded depression and the plate.

18. The backrest according to claim 17, wherein said reinforcing element and said plate are made of sheet metal.

* * * * *